United States Patent
Song et al.

(10) Patent No.: US 9,992,024 B2
(45) Date of Patent: Jun. 5, 2018

(54) ESTABLISHING A CHAIN OF TRUST WITHIN A VIRTUAL MACHINE

(75) Inventors: Zhexuan Song, Sunnyvale, CA (US); Maarten H. Wiggers, San Jose, CA (US); Ryusuke Masuoka, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 684 days.

(21) Appl. No.: 13/358,372

(22) Filed: Jan. 25, 2012

(65) Prior Publication Data
US 2013/0191643 A1  Jul. 25, 2013

(51) Int. Cl.
*H04L 9/32* (2006.01)
*G06F 21/57* (2013.01)

(52) U.S. Cl.
CPC ............ *H04L 9/3247* (2013.01); *G06F 21/57* (2013.01); *H04L 9/3265* (2013.01)

(58) Field of Classification Search
CPC ....... H04L 9/3265; H04L 9/32; H04L 9/3247; G06F 21/57
See application file for complete search history.

(56) References Cited

U.S. PATENT DOCUMENTS

| | | | | |
|---|---|---|---|---|
| 6,185,683 B1 * | 2/2001 | Ginter | ...................... | G06F 21/10 348/E5.006 |
| 6,625,729 B1 * | 9/2003 | Angelo | .................. | G06F 9/4401 711/E12.1 |
| 7,082,615 B1 * | 7/2006 | Ellison | .................... | G06F 9/468 380/44 |
| 7,424,610 B2 * | 9/2008 | Ranganathan | ........ | G06F 21/305 713/164 |
| 8,156,298 B1 * | 4/2012 | Stubblefield | ........ | G06F 12/1433 711/163 |
| 9,317,276 B2 * | 4/2016 | Gilbert | ...................... | G06F 8/65 |
| 9,467,298 B1 * | 10/2016 | Alexander | ............ | H04L 9/3265 |
| 9,467,299 B1 * | 10/2016 | Alexander | ............ | H04L 9/3265 |
| 9,674,183 B2 * | 6/2017 | Dyer | .................... | H04L 63/0853 |
| 9,721,103 B2 * | 8/2017 | Sherwood | ............. | G06F 21/575 |
| 2003/0027125 A1 | 2/2003 | Mills et al. | | |
| 2003/0135727 A1 * | 7/2003 | Challener | ............. | G06F 9/4406 713/2 |

(Continued)

FOREIGN PATENT DOCUMENTS

| | | |
|---|---|---|
| JP | 2003-271254 A | 9/2003 |
| JP | 2009-211686 A | 9/2009 |

(Continued)

OTHER PUBLICATIONS

Garfinkel et al "Terra: A Virtual Machine-Based Platform for Trusted Computing," Computer Science Department, Stanford University, ACM Oct. 19-22, 2003.*

(Continued)

*Primary Examiner* — Luu Pham
*Assistant Examiner* — James J Wilcox
(74) *Attorney, Agent, or Firm* — Maschoff Brennan

(57) ABSTRACT

According to an aspect of an embodiment, a method of establishing a chain of trust into a virtual machine on a hardware system is described. The method may include measuring an immutable portion of a virtual machine image configured to instantiate as the virtual machine to generate a trust anchor measurement. The method may also include storing the trust anchor measurement in a sealed memory.

18 Claims, 7 Drawing Sheets

(56) References Cited

U.S. PATENT DOCUMENTS

| | | | |
|---|---|---|---|
| 2004/0153646 A1* | 8/2004 | Smith | H04L 63/12 713/172 |
| 2004/0181788 A1* | 9/2004 | Kester | G06F 21/50 717/168 |
| 2005/0114683 A1* | 5/2005 | Jin | G06F 21/51 713/187 |
| 2005/0138370 A1* | 6/2005 | Goud | G06F 21/53 713/164 |
| 2005/0204205 A1* | 9/2005 | Ring | G06F 21/57 714/47.1 |
| 2005/0251867 A1* | 11/2005 | Sastry | G06F 21/57 726/34 |
| 2006/0026423 A1* | 2/2006 | Bangerter | H04L 9/3218 713/164 |
| 2007/0230504 A1* | 10/2007 | Smith | G06F 21/53 370/469 |
| 2008/0046581 A1* | 2/2008 | Molina | H04L 63/08 709/229 |
| 2008/0046758 A1* | 2/2008 | Cha et al. | 713/189 |
| 2008/0256595 A1* | 10/2008 | Schunter | G06F 21/57 726/1 |
| 2009/0019528 A1* | 1/2009 | Wei | H04L 63/08 726/4 |
| 2009/0107349 A1 | 4/2009 | Noon et al. | |
| 2009/0211686 A1 | 8/2009 | Cowen | |
| 2010/0023743 A1* | 1/2010 | Sastry | G06F 21/57 713/2 |
| 2010/0325628 A1* | 12/2010 | Haga | G06F 21/575 718/1 |
| 2011/0029974 A1* | 2/2011 | Broyles | G06F 21/57 718/1 |
| 2011/0060947 A1* | 3/2011 | Song | G06F 21/53 714/37 |
| 2011/0076605 A1 | 3/2011 | Doi et al. | |
| 2011/0302400 A1* | 12/2011 | Maino | G06F 21/575 713/2 |
| 2012/0089833 A1* | 4/2012 | Jirka | G06F 21/33 713/168 |
| 2012/0137117 A1* | 5/2012 | Bosch | G06F 21/53 713/2 |
| 2012/0167205 A1* | 6/2012 | Ghetie | G06F 21/572 726/22 |
| 2012/0260345 A1* | 10/2012 | Quinn | G06F 21/57 726/26 |
| 2013/0097296 A1* | 4/2013 | Gehrmann | G06F 9/4856 709/223 |
| 2013/0132722 A1* | 5/2013 | Bennett | H04L 9/0816 713/171 |
| 2013/0179669 A1* | 7/2013 | Song | G06F 21/575 713/2 |
| 2013/0276057 A1* | 10/2013 | Smith | G06F 21/00 726/1 |
| 2014/0013327 A1* | 1/2014 | Sherwood | G06F 9/45533 718/1 |
| 2014/0108786 A1* | 4/2014 | Kreft | G06F 21/71 713/156 |
| 2014/0215202 A1* | 7/2014 | Paris | G06F 21/572 713/100 |
| 2014/0258733 A1* | 9/2014 | Scott-Nash | G06F 12/1408 713/190 |
| 2014/0280595 A1* | 9/2014 | Mani | H04L 12/1827 709/204 |
| 2014/0281354 A1* | 9/2014 | Tkacik | G06F 12/1009 711/206 |
| 2015/0067309 A1* | 3/2015 | Dasari | G06F 9/445 713/1 |
| 2015/0188944 A1* | 7/2015 | Dyer | H04L 63/20 726/3 |
| 2015/0277987 A1* | 10/2015 | Di Balsamo | G06F 9/5083 718/104 |
| 2016/0291967 A1* | 10/2016 | Badri | G06F 8/665 |
| 2016/0350534 A1* | 12/2016 | Poornachandran | G06F 21/57 |
| 2017/0257221 A1* | 9/2017 | Peng | H04L 9/3265 |
| 2017/0264486 A1* | 9/2017 | Angell | H04L 41/0813 |
| 2017/0300309 A1* | 10/2017 | Berger | G06F 8/60 |

FOREIGN PATENT DOCUMENTS

| | | |
|---|---|---|
| JP | 2011-076605 A | 4/2011 |
| JP | 4811830 B1 | 11/2011 |
| WO | 2009/107349 A1 | 9/2009 |

OTHER PUBLICATIONS

Berger et al, "vTPM: Virtualizing the Trusted Platform Module," IBM T.J. Watson Research Center, Security '06: 15th USENIX Security Symposium, pp. 305-320.*

Microsoft Windows "Secure Startup—Full Volume Encryption: Technical Overview," Apr. 22, 2005, pp. 1-21.*

Intel et al, "Cloud Builders Guide: Cloud Design and Deployment on Intel Platforms: Enhanced Cloud Security with HyTrust, and VMWare," 2011, pp. 1-20.*

Agbinya—"A New Trust Chain Model," 2010, IEEE 24$^{th}$ International Conference on Advanced Information Networking & Applications Workshops, pp. 1077-1084.*

Anderson—"Building a Chain of Trust: Using Policy & Practice to Enhance Trustworthy Clinical Data Discovery & Sharing," ACM, Dec. 7, 2010, pp. 15-20.*

Korthaus—"A Practical Property-Based Bootstrap Architecture," STC'09, ACM, Nov. 13, 2009, pp. 29-38.*

Xu—"A Trust Chain Build Scheme for Enhancing Wireless Network Security," IEEE, 2007, pp. 2314-2317.*

Berger et al., "VTPM: Virtualizing the Trusted Platform Module", USENIX Security Symposium 2006.

"Unified Extensible Firmware Interface." Wikipedia: The free encyclopedia. (Jul. 25, 2012). Wikimedia Foundation, Inc. Retrieved Jan. 25, 2012. <http://en.wikipedia.org/wiki/Extensible_Firmware_Interface>.

Japanese Office Action dated Aug. 2, 2016 as received in Application No. JP 2013-009353.

Yamaichi, Ryo, "Virtualization Technology Update", Computerworld Get Technology Right, IDG Japan, Inc., Jan. 1, 2008, vol. 5, No. 1, pp. 58-65 (Partial Translation).

* cited by examiner

ESTABLISHING A CHAIN OF TRUST WITHIN A VIRTUAL MACHINE

FIELD

Example embodiments discussed herein are related to establishing a chain of trust within a virtual machine.

BACKGROUND

A certain class of software attacks relies on being able to modify application binaries. Remote attestation is a procedure that aims to identify to a remote entity what software, or applications, is/are currently running in an environment. Remote attestation procedures may include measuring each corresponding application binary before it starts and sending the measurement(s) to the remote entity. By comparing the measurements to expected measurements, remote detection of attacks that modify application binaries is possible.

In order to trust the measurements performed for remote attestation, a chain of trust may be created during boot-up. The chain of trust may start from a trust anchor, and each element in the chain of trust may first measure the application binary of the next element before it starts the next element. In this manner, it is always a trusted entity that performs each measurement.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of establishing a chain of trust into a virtual machine on a hardware system is described. The method may include measuring an immutable portion of a virtual machine image configured to instantiate as the virtual machine to generate a trust anchor measurement. The method may also include storing the trust anchor measurement in a sealed memory.

The object and advantages of the embodiments will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Virtual machines are widely used as an element in cloud computing. A virtual machine virtualizes the hardware on which it is running, allowing for easy migration of software to different hardware platforms. Remote attestation in a virtual machine may involve measuring a complete corresponding virtual machine image before instantiating the virtual machine. Whereas virtual machine images may be large, there may be a significant performance penalty in measuring the entire virtual machine image before instantiating the virtual machine.

Alternately or additionally, operating system and/or application updates and/or the addition of new applications, even when authorized by a corresponding remote entity, result in a new corresponding virtual machine image. Any measurement of the new virtual machine image will be different than the prior measurement, and may thus be different from a corresponding expected measurement to which the new measurement may be compared for remote attestation. Accordingly, there is not an obvious way to refresh the trust chain when the virtual machine image has been updated in an authorized manner.

According to some embodiments described herein, an immutable portion of the virtual machine image may be measured, rather than measuring the entire virtual machine image. The immutable portion may include a boot loader binary and/or may include only about 512 bytes of data, representing a relatively small amount of data. Thus, performance may improve while establishing a chain of trust by measuring only the boot loader binary, as opposed to measuring the entire virtual machine image, before instantiating the corresponding virtual machine. Alternately or additionally, the chain of trust may be refreshed each time the virtual machine is rebooted even when the operating system or applications have been updated.

Embodiments of the present invention will be explained with reference to the accompanying drawings.

Figure 1:
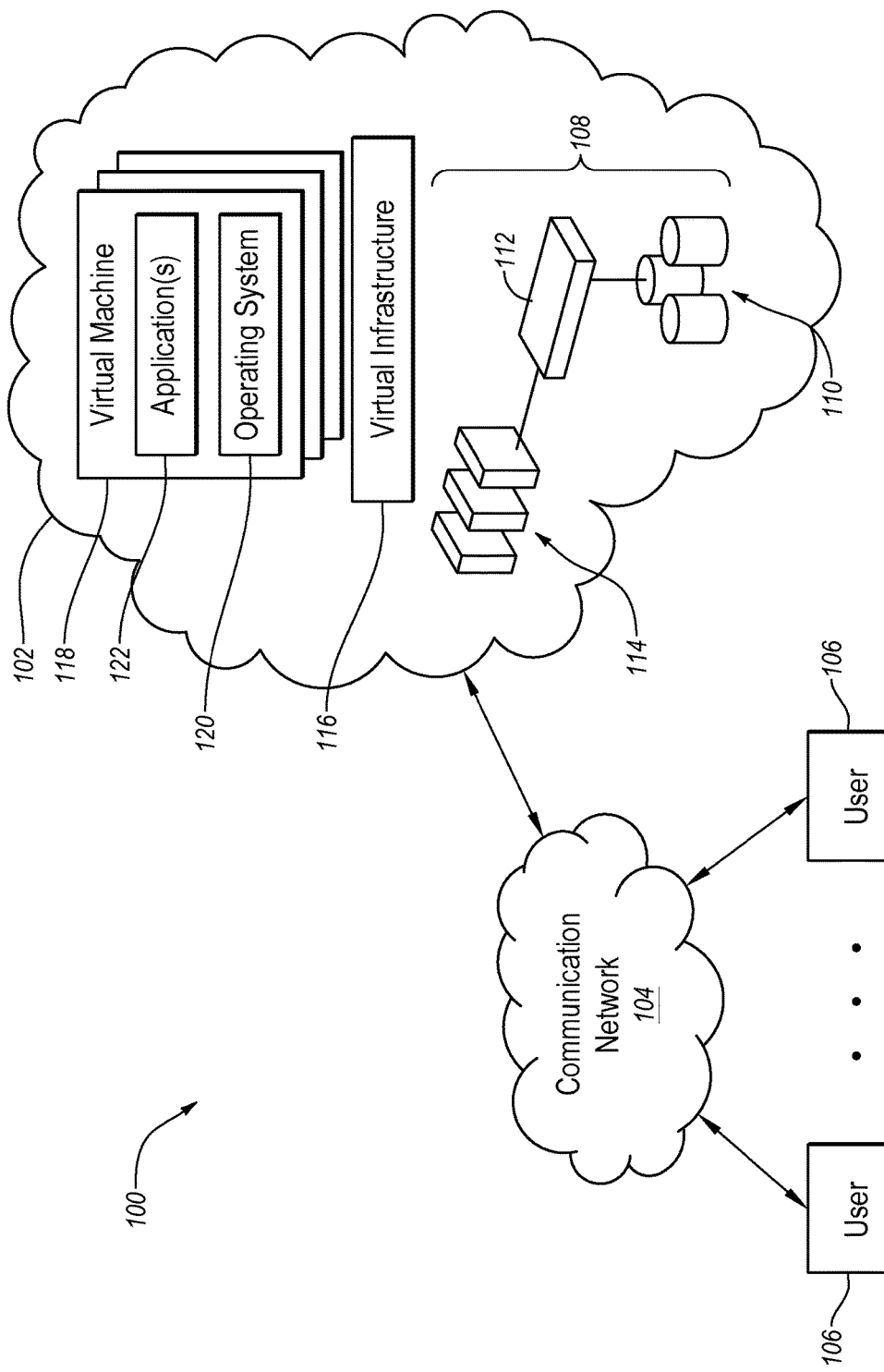
FIG. 1 illustrates an example operating environment in which a chain of trust may be established within a virtual machine.

FIG. 1 illustrates an example operating environment 100 in which a chain of trust may be established within a virtual machine, arranged in accordance with at least some embodiments described herein. The operating environment 100 may include a cloud computing system 102, a communication network 104, and one or more users 106.

In general, the communication network 104 may include one or more wide area networks (WANs) and/or local area networks (LANs) that enable the cloud computing system 102 and the users 106 to communicate with each other. In some embodiments, the communication network 104 includes the Internet, including a global internetwork formed by logical and physical connections between multiple WANs and/or LANs. Alternately or additionally, the communication network 104 may include one or more cellular RF networks and/or one or more wired and/or wireless networks such as, but not limited to, 802.xx networks, Bluetooth access points, wireless access points, IP-based networks, or the like. The communication network 104 may also include servers that enable one type of network to interface with another type of network.

The users 106 may include entities—such as individuals, business, and/or other organizations—that desire to access services provided by the cloud computing system 102. For example, the cloud computing system 102 may provide fee-based and/or free infrastructure-as-a-service (IaaS) services to the users 106. The users 106 may additionally include or have associated therewith computing devices that include suitable hardware and/or software for communicating with the cloud computing system 102 over the communication network 104. To simplify the description that follows, however, the computing devices and associated entities will simply be referred to as "users 106."

The cloud computing system 102 may include a computing resources pool 108 including one or more hardware systems, the computing resources pool 108 being accessible to users 106 over the communication network 104. Examples of hardware systems that may be included in the computing resources pool 108 may include, but are not limited to, storage 110, one or more networks and/or network devices 112, and one or more servers or other computing devices 114 (hereinafter "servers 114").

The storage 110 may include non-volatile storage such as magnetic storage, optical storage, solid state storage, or the like or any combination thereof.

The one or more networks and/or network devices 112 may facilitate communication between the storage 110 and the servers 114 within the cloud computing system 102 and may include, for example, a storage area network (SAN), a SAN fabric, routers, switches, hubs, or the like or any combination thereof.

The servers 114 may each include memory and/or one or more processors and may be configured to execute software to run and/or provide access to the cloud computing system 102, and/or to execute software that may be available in the cloud computing system 102 to users 106.

As illustrated in FIG. 1, the cloud computing system 102 may additionally include a virtual infrastructure 116 and one or more virtual machines 118. The virtual infrastructure 116 may be configured to provide a dynamic mapping of resources in the computing resources pool 108 to the one or more virtual machines 118.

Each virtual machine 118 may include an operating system 120 configured to run on virtualized resources presented to the virtual machine 118 by the virtual infrastructure 118. Each virtual machine 118 may additionally include one or more applications 122 running on the corresponding operating system 120.

Accordingly, the cloud computing system 102 may support infrastructure-as-a-service (IaaS) offerings to the users 106. For example, each of the users 106 may rent a compute node from the cloud computing system 102 with X compute performance and Y memory and/or with certain software, or the like. By virtualizing the computing resources pool 108, an IaaS provider may provide a desired compute node to each user 106 through a corresponding one of the virtual machines 118 and thereby efficiently utilize the computing resources pool 108.

In some embodiments, each virtual machine 118 may be instantiated from a virtual machine image stored in the computing resources pool 108. A virtual machine image may include a set of files containing binary code that, when executed, may instantiate a corresponding virtual machine 118. Each virtual machine image may include multiple portions, including an immutable portion such as a boot loader binary, and one or more other portions such as an operating system binary corresponding to the operating system 120, and one or more application binaries corresponding to the one or more applications 122.

The virtual infrastructure 116 may include one or more hypervisors installed on the computing resources pool 108. In some embodiments, for instance, the virtual infrastructure 116 may include a hypervisor installed on separate hardware systems of the computing resources pool 108, such as on each of the servers 114.

Each hypervisor may be configured to establish a chain of trust into each virtual machine 118. The chain of trust may be established into each virtual machine 118 during or before instantiation of the virtual machine 118, for example, and may include measuring the immutable portion of the corresponding virtual machine image to generate a trust anchor measurement, and storing the trust anchor measurement in sealed memory. The sealed memory may generally include any memory locations having restricted read and/or write access, such as one or more registers in a trusted platform module (TPM) chip, for instance. Alternately or additionally, the chain of trust into each virtual machine 118 may be linked with a chain of trust of a hardware system within the computing resources pool 108 on which the corresponding virtual machine 118 has been instantiated, as described in greater detail below.

Alternately or additionally, the chain of trust may be extended within each virtual machine 118. For example, for a given one of the virtual machines 118, the boot loader may be configured to measure the operating system binary to generate an operating system measurement and may be further configured to store the operating system measurement in the sealed memory. Further, after instantiating the operating system 120 from the operating system binary, the operating system 120 may be configured to measure each of the one or more application binaries of the virtual machine image to generate a corresponding application measurement and may be further configured to store the application measurement in the sealed memory.

In some embodiments, the cloud computing system 102 may be configured to provide remote attestation of each virtual machine 118 to a corresponding one of the users 106 to allow detection of certain software attacks. In particular, the cloud computing system 102 may be configured, in response to requests by the corresponding one of the users 106, to provide to the user 106 a set of measurements including, for a given one of the virtual machines 118, a corresponding trust anchor measurement of the boot loader binary, an operating system measurement of the operating system binary, and one or more application measurements of the one or more application binaries. The set of measurements may be signed by the cloud computing system 102, or more particularly, by a hardware system of the cloud computing system 102 on which the corresponding virtual machine 118 is instantiated. Signing the set of measurements may include the hardware system of the cloud computing system 102 including a probabilistically unique identifier associated with the hardware system with the set of measurements.

The user 106 may be configured to then determine whether any unauthorized applications are executing in the corresponding virtual machine 118, or whether any unauthorized modification have occurred in any of the corresponding boot loader binary, operating system binary, or one or more application binaries, by comparing the set of measurements against expected measurements known to the user 106. In some embodiments, the user 106 may additionally authenticate the cloud computing system 102 based on the signature of the set of measurements. Alternately or additionally, the user 106 may previously receive the expected measurements from the cloud computing system 102, e.g., when the user 106 first instantiates the corresponding virtual machine 118 in the cloud computing system 118.

Figure 2:
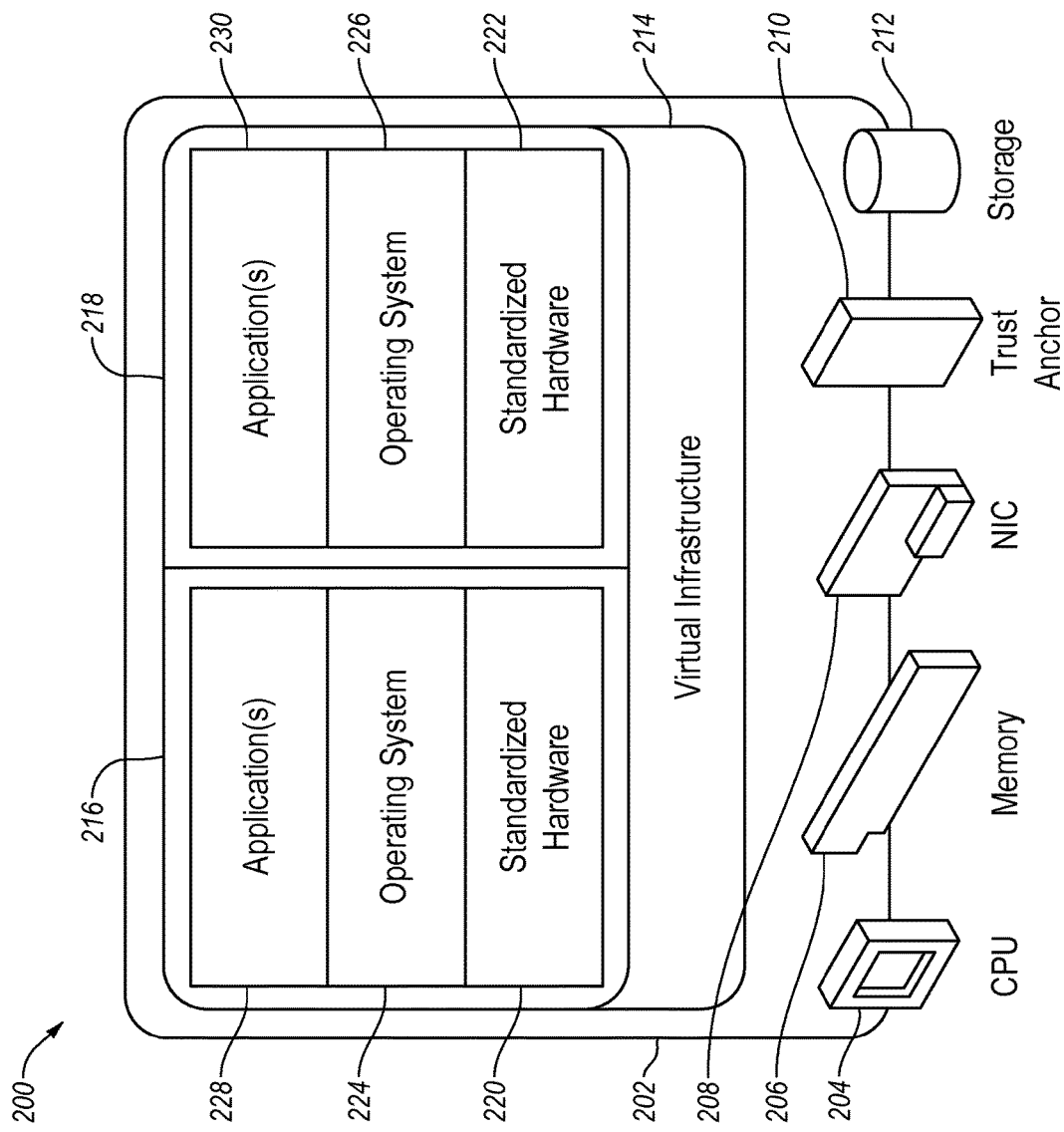
FIG. 2 is a block diagram of an embodiment of a hardware system that may be implemented in the operating environment of FIG. 1.

FIG. 2 is a block diagram of an embodiment of a hardware system 200 that may be implemented in the operating environment 100 of FIG. 1, arranged in accordance with at least some embodiments described herein. For example, the hardware system 200 may correspond to any one of the servers 114 in the cloud computing system 102 of FIG. 1. The hardware system 200 may include one or more hardware resources 202, that may include, but are not limited to, a central processing unit 204 or other processor, memory 206, a network interface controller (NIC) 208, a hardware trust anchor 210, and storage 212.

The hardware system 200 may additionally include a virtual infrastructure 214, such as a hypervisor, installed on the hardware resources 202. The virtual infrastructure 212 may correspond to the virtual infrastructure 116 of FIG. 1, for example, and may generally manage access to or "virtualize" the hardware resources 202 into a uniform pool and separate the hardware of this pool from one or more virtual machines 216, 218. Although two virtual machines 216, 218 are depicted in FIG. 2, more generally the hardware system 200 may include more or fewer than two virtual machines 216, 218 running thereon. By virtualizing the hardware resources 202, the virtual infrastructure 214 may present standardized hardware 220, 222 having any desired configuration to an operating system 224, 226 of each virtual machine 216, 218. One or more applications 228, 230 may run within each virtual machine 216, 218 on the corresponding operating system 224, 226.

According to some embodiments described herein, each virtual machine 216, 218 may be instantiated from a corresponding virtual machine image including an immutable portion and one or more other portions as described herein. In these and other embodiments, the virtual infrastructure 214, such as a hypervisor, may establish a chain of trust into each of the virtual machines 216, 218 as already described herein.

Figure 3A:
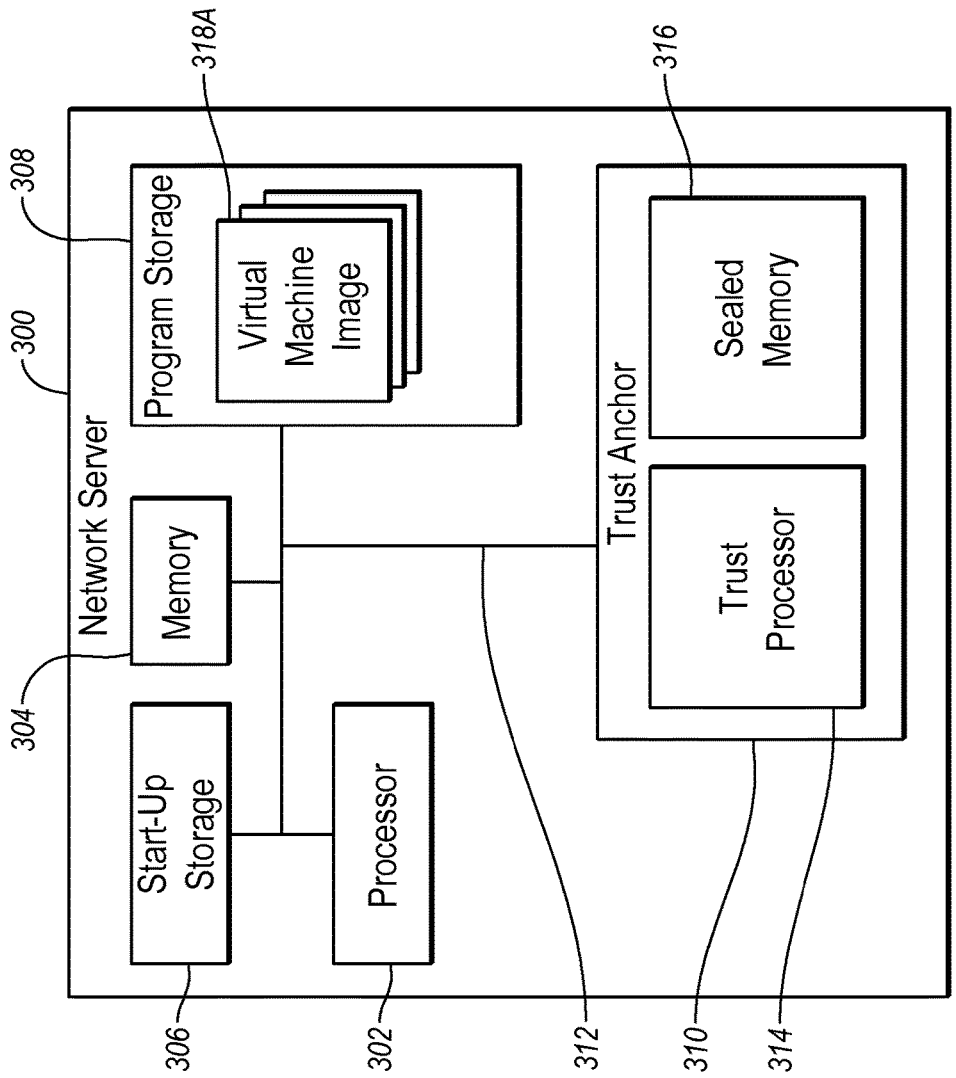
FIG. 3A is a block diagram of another embodiment of a hardware system implemented as a network server.

FIG. 3A is a block diagram of another embodiment of a hardware system implemented as a network server 300, arranged in accordance with at least some embodiments described herein. The network server 300 may be implemented in the operating environment 100 of FIG. 1 and may correspond to, for instance, any one of the servers 114 in the cloud computing system 102 of FIG. 1. The network server 300 may include a processor 302, memory 304, start-up storage 306, program storage 308, a hardware trust anchor 310, and a communication bus 312 configured to communicably couple the foregoing components together.

In some embodiments, the hardware trust anchor 310 may be a TPM security device or chip. In other embodiments, the hardware trust anchor 310 may be another type of cryptoprocessor or cryptomicroprocessor, or the like. More generally, the hardware trust anchor 310 may include any type of device configured to perform the functions described herein.

As illustrated in FIG. 3A, the hardware trust anchor 310 may include a trust processor 314 and a sealed memory 316. The sealed memory 316 may be implemented using one or more registers in the hardware trust anchor 310, such as one or more registers in a TPM chip. More generally, the sealed memory 316 may include any memory locations having restricted read and/or write access, such as addressable locations within a memory device of the hardware trust anchor 310.

FIG. 3A further illustrates that the program storage 308, or other storage location of the network server 300, may include one or more virtual machine images 318A stored thereon. Each of the virtual machine images 318A may be configured to instantiate a corresponding virtual machine, such as a corresponding one of the virtual machines 118, 216, 218 of FIGS. 1-2. In particular, after the network server 300 is booted up, one or more of the virtual machine images 318A may be loaded to the memory 304 and executed by the processor 302 to instantiate a corresponding virtual machine (not shown) that runs on the network server 300.

As described previously, each of the virtual machine images 318A may include an immutable portion such as a boot loader binary configured to instantiate as a boot loader. Each of the virtual machine images may additionally include one or more other portions such as an operating system binary and one or more application binaries, respectively corresponding to an operating system and one or more applications that may run in a corresponding virtual machine instantiated from the virtual machine image 318A.

Figure 3B:
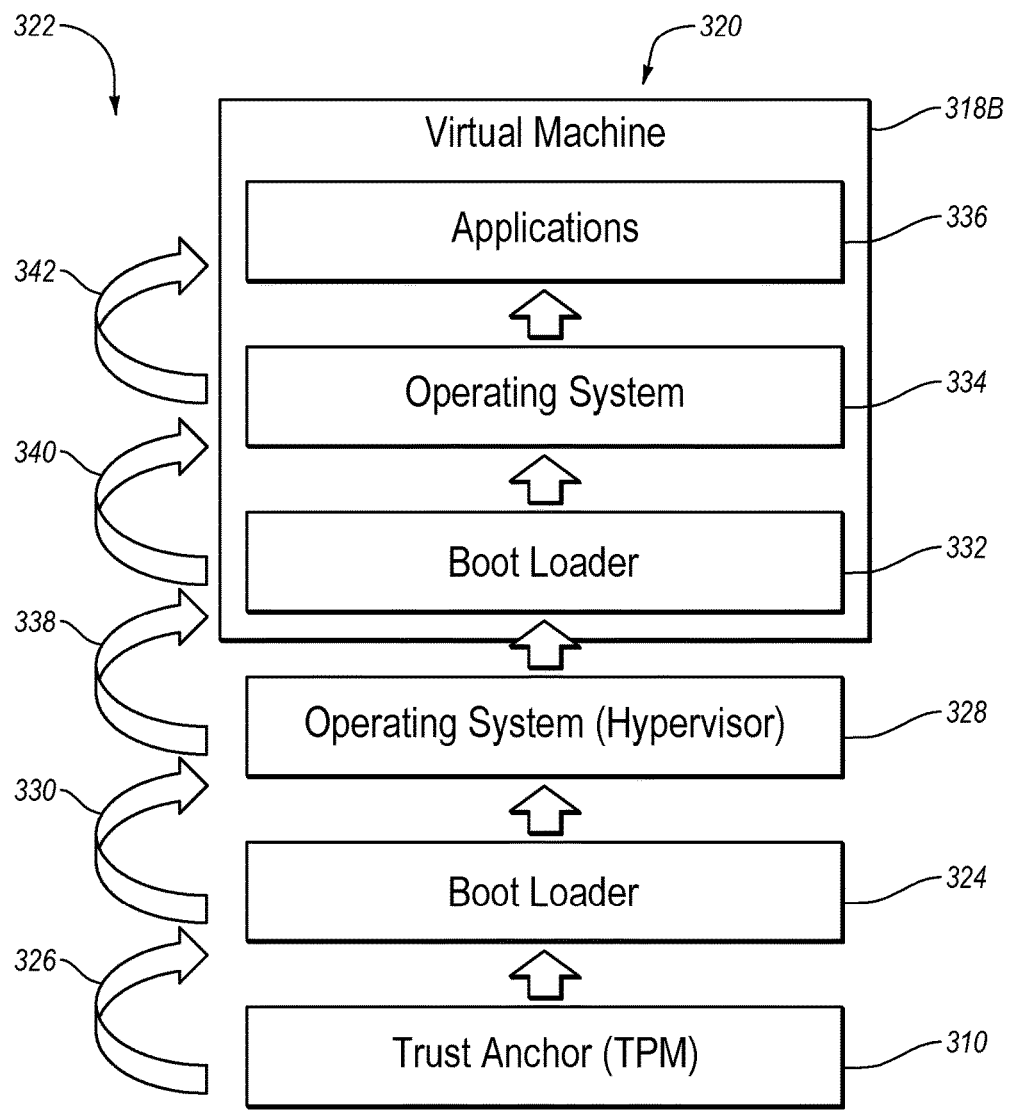
FIG. 3B illustrates an example of an invocation chain that may be implemented to boot up a virtual machine on the network server of FIG. 3A.

FIG. 3B illustrates an example of an invocation chain 320 that may be implemented to boot up a virtual machine 318B on the network server 300 of FIG. 3A, arranged in accordance with at least some embodiments described herein. The virtual machine 318B may be instantiated from, e.g., a corresponding one of the virtual machine images 318A of FIG. 3A. To allow a corresponding user to verify that only authorized software is running in the virtual machine 318B and/or that none of the authorized software has been modified in an unauthorized manner, a chain of trust 322 may also be established as the invocation chain 320 proceeds.

With combined reference to FIGS. 3A-3B, the invocation chain 320 may begin at power-up of the network server 300, at which time the hardware trust anchor 310, or more particularly, the trust processor 314, may access a boot loader binary (not shown) stored in the start-up storage 306 and configured to instantiate as a boot loader 324. The boot loader 324 may be executed by the trust processor 314 and/or the processor 302

At power-up, the hardware trust anchor 310 may additionally measure the boot loader binary corresponding to the boot loader 324 to generate a boot loader measurement as part of establishing the chain of trust 322, as denoted at 326. The boot loader measurement may be stored in the sealed memory 316.

In these and other embodiments, measurements may be performed by generating a probabilistically unique identifier for the object being measured. For example, a hash function may be applied to the object being measured, which object is the boot loader binary corresponding to the boot loader 324 in this example, to generate a hash value as the measurement of the object. More generally, the measurement of an object may include any suitable probabilistically unique identifier, such as, but not limited to, a hash value, a checksum, a fingerprint, or a check digit.

In general, the boot loader 324 may be configured to trigger execution of an operating system binary (not shown) configured to instantiate an operating system 328, which may be implemented as a hypervisor in some embodiments. For example, execution of the boot loader 324 may cause the operating system binary to be read from the start-up storage 306 into memory 304 for execution by the processor 302 to instantiate the operating system 328.

The boot loader 324 may additionally measure the operating system binary corresponding to the operating system 328 to generate an operating system measurement as part of establishing the chain of trust 322, as denoted at 330. The operating system measurement may be stored in the sealed memory 316.

The invocation chain 320 may continue with the operating system 328 invoking a boot loader binary of the virtual machine image 318A corresponding to the virtual machine 318B to instantiate a corresponding boot loader 332. The boot loader 332 may invoke an operating system binary of the virtual machine image 318A to instantiate a corresponding operating system 334. The operating system 334 may invoke one or more application binaries of the virtual machine image 318A to instantiate one or more corresponding applications 336.

Establishment of the chain of trust 322 may continue in a manner similar to the invocation chain 320. In particular, during and/or prior to instantiation of the virtual machine 318B, the operating system 328 may measure 338 the boot loader binary corresponding to the boot loader 332 to generate a trust anchor measurement that is stored in the sealed memory 316. The boot loader 332 may measure 340 the operating system binary corresponding to the operating system 334 to generate an operating system measurement for the virtual machine 318B that is stored in the sealed memory 316. The operating system 334 may measure 342 one or more application binaries corresponding to the one or more applications 336 to generate one or more application measurements that are stored in the sealed memory 316.

As previously indicated, the chain of trust 322 may allow a corresponding user, such as one of the users 106 of FIG. 1, to verify that only authorized software is running in the virtual machine 318B and/or that none of the authorized software has been modified in an unauthorized manner. In particular, in response to a request by a corresponding one of the users 106, e.g., one of the users 106 associated with the virtual machine 318B, the hardware trust anchor 310 may be configured to sign and send a set of measurements to the user 106. The set of measurements may include one or more of the boot loader measurement, the first operating system measurement, the trust anchor measurement, the second operating system measurement, and the one or more application measurements described with respect to FIGS. 3A-3B.

The user 106 may be configured to then determine whether any unauthorized applications are executing in the corresponding virtual machine 318B, or whether any unauthorized modifications have occurred in any of the corresponding boot loader binary, operating system binary, or one or more application binaries of the corresponding virtual machine image 318A, by comparing the set of measurements against expected measurements known to the user 106. In some embodiments, the user 106 may additionally authenticate the hardware trust anchor 310 based on the signature of the set of measurements. The user 106 may previously receive the expected measurements as described above.

Figure 4:
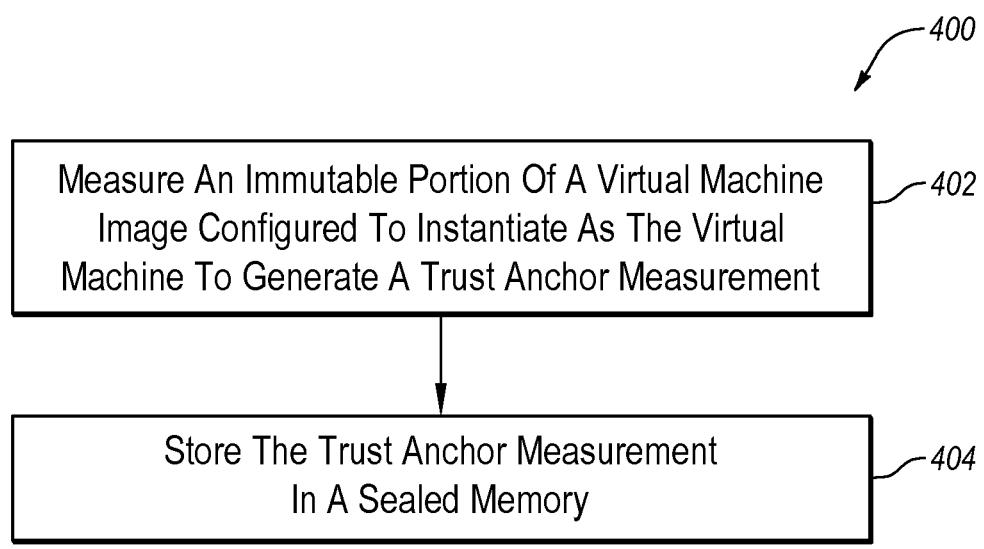
FIG. 4 is a flowchart of an example method of establishing a chain of trust into a virtual machine on a hardware system.

FIG. 4 is a flowchart of an example method 400 of establishing a chain of trust into a virtual machine on a hardware system, arranged in accordance with at least some embodiments described herein. In some embodiments, the method 400 may be performed in whole or in part by a cloud computing system, such as the cloud computing system 102 of FIG. 1. More particularly, the method 400 may be performed in whole or in part by a hardware system, such as the hardware system 200 of FIG. 2 or the network server 300 of FIG. 3, and/or by software running on the corresponding hardware system.

The method 400 may begin at block 402 in which an immutable portion of a virtual machine image configured to instantiate as a virtual machine is measured to generate a trust anchor measurement. As already explained herein, the virtual machine image may include a boot loader binary, an operating system binary, and one or more application binaries and the immutable portion of the virtual machine image may include the boot loader binary. Alternately or additionally, the trust anchor measurement may include a probabilistically unique identifier of the immutable portion, such as, but not limited to, a hash value, a checksum, a fingerprint, or a check digit.

The method 400 may continue at block 404 in which the trust anchor measurement is stored in a sealed memory. The sealed memory may include one or more registers in a hardware trust anchor, such as a TPM chip, and may correspond to the sealed memory 316 of FIG. 3A, for instance.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, although not illustrated in FIG. 4, the method 400 may further include measuring, by the boot loader of the virtual machine, the operating system binary of the virtual machine image to generate an operating system measurement. The operating system measurement may be stored in the sealed memory. The method 400 may further include measuring, by an operating system instantiated from the operating system binary, the one or more application binaries of the virtual machine image to generate one or more application measurements. The one or more application measurements may be stored in the sealed memory.

The method 400 may further include instantiating a virtual machine from the virtual machine image. A request may be received for a set of measurements including the trust anchor measurement, the operating system measurement, and the one or more application measurements. The set of measurements may be signed with a signature. For instance, the set of measurements may be signed by a hardware trust anchor, such as the hardware trust anchor 210, 310 of FIGS. 2-3A. The signed set of measurements may be sent to an entity that requested the set of measurements, such as to one of the users 106 of FIG. 1.

In some embodiments, the entity may be configured to verify the signature. The signature may be verified by comparing the signature against an expected signature. The entity may also be configured to compare the signed set of measurements against expected measurements. The expected signature and/or the expected measurements may be stored in storage accessible to the entity. The entity may compare the signed set of measurements against expected measurements to determine whether any unauthorized applications are executing on the virtual machine or whether any unauthorized modifications have occurred in any of the boot loader binary, the operating system binary, or the one or more application binaries. Any differences in the measurements may indicate that one or more unauthorized applications are executing on the virtual machine, and/or that the boot loader binary, the operating system binary, and/or the one or more application binaries have been altered or changed in an unauthorized manner, or the like. Accordingly, the entity may identify the existence of unauthorized software and/or modifications in the virtual machine associated with the entity and may act accordingly, such as by deleting any unauthorized applications, or restoring a boot loader binary, operating system binary, or application binary having unauthorized modifications to a corresponding unmodified version.

Alternately or additionally, the method 400 may further include refreshing the chain of trust in the virtual machine any time the virtual machine reboots. Refreshing the chain of trust in the virtual machine any time the virtual machine reboots may include, in response to the virtual machine rebooting, re-measuring the immutable portion including the boot loader binary to re-generate the trust anchor measurement. The re-generated trust anchor measurement may be stored in the sealed memory. The boot loader may re-measure the operating system binary to re-generate the operating system measurement. The re-generated operating system measurement may be stored in the sealed memory. The operating system instantiated from the operating system binary may re-measure the one or more application binaries to re-generate the one or more application measurements. The re-generated one or more application measurements may be stored in the sealed memory.

In some embodiments, the method 400 may additionally include identifying a location and size in the virtual machine image of the boot loader binary. Identifying a location and size of the boot loader binary may include querying a boot loader information database (BLIDB) which may be configured to return a size of the boot loader binary and a location of the virtual machine image. In these and other embodiments, the boot loader binary may be located in a first 512 bytes of a location of a hard disk of the hardware system identified as the location of the virtual machine image. Alternately, the boot loader binary may be located in a partition of the hard disk determined by reading a partition table of the hard disk.

Figure 5A:
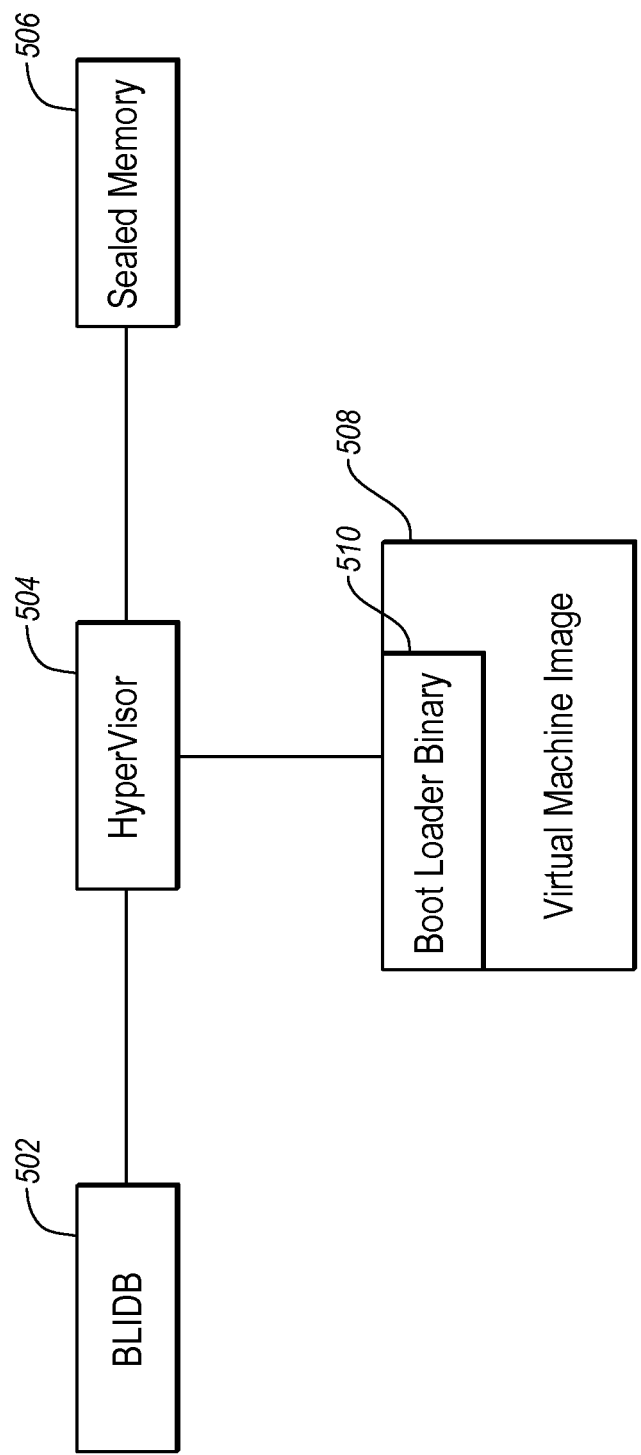
FIG. 5A is a block diagram of various components associated with instantiating a virtual machine.

FIG. 5A is a block diagram of various components associated with instantiating a virtual machine, arranged in accordance with at least some embodiments described herein. In particular, FIG. 5A illustrates a BLIDB 502, a hypervisor 504, a sealed memory 506, and a virtual machine image 508 including a boot loader binary 510.

The BLIDB 502 may be stored in the storage 212 of FIG. 2 and/or the program storage 308 of FIG. 3A, or the like.

The hypervisor 504 may be instantiated on the hardware system 200 of FIG. 2 and/or the network server 300 of FIG. 3A, or the like. The hypervisor 504 may correspond to the operating system 328 of FIG. 3B, for instance.

The sealed memory 506 may correspond to the sealed memory 316 of FIG. 3A, for example.

The virtual machine image 508 and boot loader binary 510 may correspond to the virtual machine image 318A of FIG. 3A and a boot loader binary from which the boot loader 332 of FIG. 3B is instantiated, for instance.

Figure 5B:
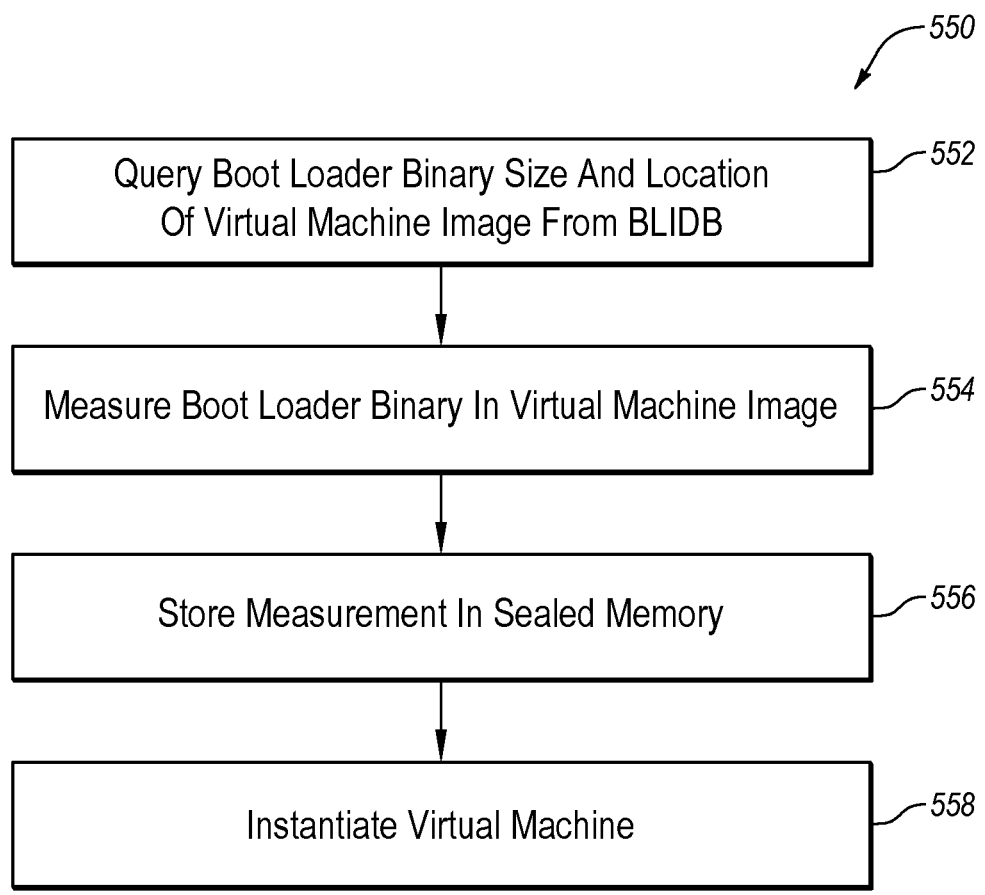
FIG. 5B is a flowchart of an example method of instantiating a virtual machine, all arranged in accordance with at least some embodiments described herein.

FIG. 5B is a flowchart of an example method 550 of instantiating a virtual machine, arranged in accordance with at least some embodiments described herein. The method 550 may be performed in whole or in part by, e.g., the hypervisor 504 of FIG. 5A. The method 550 of FIG. 5B will be described in the context of FIG. 5A.

The method 500 may begin at block 552 in which the hypervisor 504 queries the size of the boot loader binary 510 and a location of the virtual machine image 508 from the BLIDB 502. The BLIDB 502 may return the size of the boot loader binary 510 and the location of the virtual machine image 508. In some embodiments, as described above, the boot loader binary 510 may be located in a first 512 bytes of a location of a hard disk identified as the location of the virtual machine image, or the boot loader may be located in a partition of the hard disk determined by reading a partition table of the hard disk.

The method 500 may continue at block 554 in which the hypervisor 504 measures the boot loader binary 510 in the virtual machine image 508. For instance, the hypervisor 504 may measure the boot loader binary 510 by generating a hash value of the boot loader binary 510, or by generating some other probabilistically unique identifier of the boot loader binary 510.

The method 500 may continue at block 556 in which the measurement is stored in the sealed memory 506, and at block 558 in which a corresponding virtual machine is instantiated from the virtual machine image 508.

Accordingly, some embodiments described herein may improve performance by establishing a chain of trust into a virtual machine by initially measuring only an immutable portion, such as a boot loader binary, of the corresponding virtual machine image. Whereas a boot loader binary may represent only a relatively small portion of a virtual machine image, the boot loader binary may be measured using less processing resources and/or in less time than measuring the entire virtual machine image.

Alternately or additionally, whereas some systems may establish a chain of trust by measuring an entire virtual machine image, the chain of trust may not be re-established when a portion of the virtual machine image is modified, such as when the operating system is updated. In particular, any such update may result in a measurement of the virtual machine image that no longer matches the expected value.

In contrast, some embodiments described herein establish the chain of trust into a virtual machine by measuring only the boot loader binary such that the chain of trust may still be established into the virtual machine in view of operating system updates, or the like. In these and other embodiments, a new expected measurement for the operating system may be provided to the corresponding user or entity associated with the virtual machine when the operating system update is downloaded such that the chain of trust may be established all the way to the one or more applications running on the updated operating system.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although embodiments of the present inventions have been described in detail, it should be understood that the various changes, substitutions, and alterations could be made hereto without departing from the spirit and scope of the invention.

What is claimed is:

1. A method, comprising:
    providing an infrastructure-as-a-service (IaaS) via a cloud computing system having a computing resources pool with one or more hardware systems;
    establishing, by a hypervisor installed on the computing resources pool, a chain of trust into a virtual machine by measuring a boot loader binary of the virtual machine to generate a trust anchor measurement that is configured to be compared with an expected trust anchor measurement to determine whether a first unauthorized modification has occurred in the boot loader binary of the virtual machine, wherein the trust anchor measurement includes one of: a checksum, a fingerprint, or a check digit, wherein the boot loader binary is configured to instantiate as a boot loader that is configured to trigger execution of an operating system binary in a virtual machine image of the virtual machine, and the boot loader binary represents at least part of an immutable portion of the virtual machine image configured to instantiate as the virtual machine;
    storing the checksum, the fingerprint, or the check digit in a sealed memory, wherein the trust anchor measurement of the virtual machine is linked to a second chain of trust of a hardware system within the computing resources pool on which the virtual machine may be instantiated;
    identifying a size of the boot loader binary and a location of the virtual machine image by querying a boot loader information database, the boot loader information database returning the size of the boot loader binary and the location of the virtual machine image;
    measuring, by the boot loader instantiated from the boot loader binary, the operating system binary to generate an operating system measurement that is configured to be compared with an expected operating system measurement to determine whether a second unauthorized modification has occurred in the operating system binary;
    storing the operating system measurement in the sealed memory;
    booting the virtual machine using an invocation chain at the hardware system within the computing resources pool by accessing the boot loader binary; and
    refreshing the chain of trust in response to a rebooting of the virtual machine, wherein the virtual machine image is modified before the rebooting of the virtual machine and refreshing the chain of trust includes:
        re-measuring the boot loader binary to re-generate the trust anchor measurement that is configured to be compared with the same expected trust anchor measurement wherein re-generating the trust anchor measurement includes re-generating one of: a new checksum, a new fingerprint, or a new check digit; and
        measuring an updated operating system binary in the modified virtual machine image to generate a new operating system measurement that is configured to be compared with a new expected operating system measurement.

2. The method according to claim 1, wherein the trust anchor measurement comprises a probabilistically unique identifier of the immutable portion.

3. The method according to claim 2, wherein the probabilistically unique identifier comprises a hash value.

4. The method according to claim 1, wherein the virtual machine image comprises the boot loader binary, the operating system binary, and one or more application binaries.

5. The method according to claim 4, further comprising:
    measuring, by an operating system instantiated from the operating system binary, the one or more application binaries to generate one or more application measurements; and
    storing the one or more application measurements in the sealed memory.

6. The method according to claim 5, further comprising:
    instantiating the virtual machine from the virtual machine image;
    receiving a request for a set of measurements including the trust anchor measurement, the operating system measurement, and the one or more application measurements;
    signing the set of measurements with a signature; and
    sending the signed set of measurements to an entity that requested the set of measurements,
    wherein the entity is configured to verify the signature and compare the signed set of measurements against expected measurements to determine whether any unauthorized applications are executing on the virtual machine or whether any unauthorized modifications have occurred in any of the boot loader binary, the operating system binary, or the one or more application binaries.

7. The method according to claim 5, further comprising refreshing the chain of trust in the virtual machine any time the virtual machine reboots.

8. The method according to claim 7, wherein refreshing the chain of trust in the virtual machine any time the virtual machine reboots comprises, in response to the virtual machine rebooting:
- re-measuring the immutable portion comprising the boot loader binary to re-generate the trust anchor measurement;
- storing the re-generated trust anchor measurement in the sealed memory;
- re-measuring, by the boot loader, the operating system binary to re-generate the operating system measurement;
- storing the re-generated operating system measurement in the sealed memory;
- re-measuring, by the operating system instantiated from the operating system binary, the one or more application binaries to re-generate the one or more application measurements; and
- storing the re-generated one or more application measurements in the sealed memory.

9. The method according to claim 1, wherein:
- the boot loader binary is located in a first 512 bytes of a location of a hard disk of the hardware system identified as the location of the virtual machine image; or
- the boot loader is located in a partition of the hard disk determined by reading a partition table of the hard disk.

10. A hardware system comprising:
- one or more hardware resources that collectively comprise a cloud computing system having a computing resources pool with one or more virtual machines, the cloud computing system being configured as an infrastructure-as-a-service (IaaS);
- a virtual machine image configured to instantiate as a virtual machine on the one or more hardware resources in the computing resources pool, the virtual machine image including an immutable portion and one or more other portions; and
- a hypervisor installed on the one or more hardware resources in the computing resources pool, the hypervisor configured to establish a chain of trust into the virtual machine by:
  - identifying a size of the boot loader binary of the virtual machine and a location of the virtual machine image by querying a boot loader information database, the boot loader information database returning the size of the boot loader binary of the virtual machine and the location of the virtual machine image;
  - measuring a first boot loader binary of the virtual machine to generate a trust anchor measurement that is configured to be compared with an expected trust anchor measurement to determine whether a first unauthorized modification has occurred in the first boot loader binary of the virtual machine, wherein the trust anchor measurement includes one of: a checksum, a fingerprint, or a check digit, wherein the first boot loader binary is configured to instantiate as a first boot loader that is configured to trigger execution of a first operating system binary in the virtual machine image of the virtual machine, and the first boot loader binary represents at least part of the immutable portion of the virtual machine image configured to instantiate as the virtual machine;
  - storing the checksum, the fingerprint, or the check digit in a sealed memory, wherein the trust anchor measurement of the virtual machine is linked to a second chain of trust of a hardware system within the computing resources pool on which the virtual machine may be instantiated;
  - measuring, by the first boot loader instantiated from the first boot loader binary, the first operating system binary to generate a first operating system measurement that is configured to be compared with an expected operating system measurement to determine whether a second unauthorized modification has occurred in the first operating system binary;
  - storing the first operating system measurement in the sealed memory; and
  - refreshing the chain of trust in response to a rebooting of the virtual machine, wherein the virtual machine image is modified before the rebooting of the virtual machine and refreshing the chain of trust includes:
    - re-measuring the first boot loader binary to re-generate the trust anchor measurement that is configured to be compared with the same expected trust anchor measurement, wherein re-generating the trust anchor measurement includes re-generating one of: a new checksum, a new fingerprint, or a new check digit; and
    - measuring an updated first operating system binary in the modified virtual machine image to generate a new first operating system measurement that is configured to be compared with a new expected first operating system measurement.

11. The hardware system according to claim 10, wherein the hypervisor is instantiated from a second operating system binary of the hardware system, the hardware system further comprising a hardware trust anchor and a second boot loader binary.

12. The hardware system according to claim 11, wherein the hardware trust anchor comprises a trusted platform module (TPM) chip and the sealed memory comprises one or more registers in the TPM chip.

13. The hardware system according to claim 11, wherein the immutable portion of the virtual machine image comprises the first boot loader binary and the one or more other portions of the virtual machine image comprise the first operating system binary configured to instantiate an operating system and an application binary configured to instantiate an application run on the operating system of the virtual machine, further wherein the hardware system is configured to establish the chain of trust to the application by:
- the hardware trust anchor measuring the second boot loader binary of the hardware system to generate a boot loader measurement, and the hardware trust anchor storing the boot loader measurement in the sealed memory;
- a second boot loader instantiated from the second boot loader binary of the hardware system measuring the second operating system binary of the hardware system to generate a second operating system measurement, and the second boot loader of the hardware system storing the second operating system measurement in the sealed memory;
- the hypervisor establishing the chain of trust into the virtual machine;
- the first boot loader instantiated from the first boot loader binary of the virtual machine measuring the first operating system binary of the virtual machine image to generate the first operating system measurement, and the first boot loader of the virtual machine storing the first operating system measurement in the sealed memory; and the operating system of the virtual machine measuring the application binary to generate an application measurement and the operating system of the virtual machine storing the application measurement in the sealed memory.

14. The hardware system according to claim 10, wherein the hypervisor is configured to measure the immutable portion of the virtual machine image to generate the trust anchor measurement by hashing the immutable portion to generate a hash value of the immutable portion.

15. The hardware system according to claim 10, wherein the hypervisor is further configured to establish the chain of trust into the virtual machine by querying a boot loader information database to identify a location and a size in the virtual machine image of the boot loader binary.

16. A cloud computing system comprising:
a computing resources pool including one or more hardware systems, the computing resources pool being accessible to users over a communication network, the computing resources pool having one or more virtual machines, the computing resources pool being configured in an infrastructure-as-a-service (IaaS) offering to the users over the communication network;
a plurality of virtual machine images, each configured to instantiate as a virtual machine on the computing resources pool, each virtual machine image including an immutable portion and one or more other portions;
providing at least one virtual machine associated with the plurality of virtual machine images as a compute node in the IaaS offering; and
one or more hypervisors installed on the computing resources pool, each of the one or more hypervisors configured to establish a chain of trust into one or more of the plurality of virtual machines by, for each virtual machine:
identifying a size of the boot loader binary of the virtual machine and a location of the virtual machine image by querying a boot loader information database, the boot loader information database returning the size of the boot loader binary and the location of the virtual machine image;
measuring a corresponding boot loader binary of the virtual machine to generate a corresponding trust anchor measurement that is configured to be compared with an expected trust anchor measurement to determine whether a first unauthorized modification has occurred in the corresponding boot loader binary of the virtual machine, wherein the trust anchor measurement includes one of: a checksum, a fingerprint, or a check digit, wherein the corresponding boot loader binary is configured to instantiate as a corresponding boot loader that is configured to trigger execution of a corresponding operating system binary in a corresponding virtual machine image of the virtual machine, and the corresponding boot loader binary represents at least part of an immutable portion of the corresponding virtual machine image configured to instantiate as the corresponding virtual machine;
storing the corresponding checksum, the fingerprint, or the check digit in a sealed memory, wherein the trust anchor measurement of the virtual machine is linked to a second chain of trust of a hardware system within the computing resources pool on which the virtual machine may be instantiated;
measuring, by the corresponding boot loader instantiated from the corresponding boot loader binary, the corresponding operating system binary to generate a corresponding operating system measurement that is configured to be compared with an expected operating system measurement to determine whether a second unauthorized modification has occurred in the corresponding operating system binary;
storing the corresponding operating system measurement in the sealed memory; and
refreshing the chain of trust in response to a rebooting of the corresponding virtual machine, wherein the corresponding virtual machine image is modified before the rebooting of the corresponding virtual machine and refreshing the chain of trust includes:
re-measuring the corresponding boot loader binary to re-generate the corresponding trust anchor measurement that is configured to be compared with the same expected trust anchor measurement, wherein re-generating the trust anchor measurement includes re-generating one of: a new checksum, a new fingerprint, or a new check digit; and
measuring an updated corresponding operating system binary in the modified corresponding virtual machine image to generate a new corresponding operating system measurement that is configured to be compared with a new expected operating system measurement.

17. The cloud computing system according to claim 16, wherein the immutable portion of each virtual machine image comprises the corresponding boot loader binary of the corresponding virtual machine image, and the one or more other portions of each virtual machine image include the corresponding operating system binary of the corresponding virtual machine image configured to instantiate a corresponding operating system and a corresponding application binary configured to instantiate an application run on the corresponding operating system, wherein for each virtual machine:
the corresponding boot loader instantiated from the corresponding boot loader binary of the corresponding virtual machine image is configured to measure the corresponding operating system binary of the corresponding virtual machine image to generate the corresponding operating system measurement, and the corresponding boot loader is further configured to store the corresponding operating system measurement in the sealed memory; and
the corresponding operating system is configured to measure the corresponding application binary to generate an application measurement and the corresponding operating system is further configured to store the application measurement in the sealed memory.

18. The cloud computing system according to claim 17, wherein the cloud computing environment is configured to provide remote attestation of each virtual machine to a corresponding user to allow detection of certain software attacks by:
in response to requests by the corresponding user, providing a set of measurements including a corresponding trust anchor measurement, operating system measurement, and application measurement to the corresponding user,
wherein the user is configured to determine whether any unauthorized applications are executing on the corresponding virtual machine or whether any unauthorized modifications have occurred in any of the corresponding boot loader binary, operating system binary, or application binary by comparing the set of measurements against expected measurements known to the user.

\* \* \* \* \*